W. H. MURCH.
Culinary Vessel.
No. 113,442.
Patented Apr. 4, 1871.
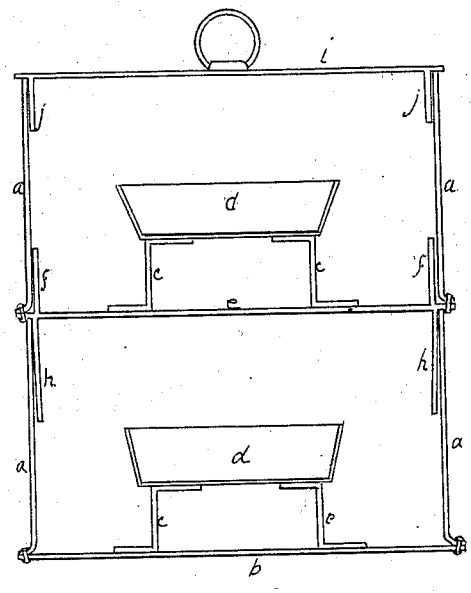
Witness
Henry C. Houston
Wm Franklin Seavey
Inventor
W. H. Murch
Per W. H. Clifford atty

United States Patent Office.

WILLIAM H. MURCH, OF PORTLAND, MAINE.

Letters Patent No. 113,442, dated April 4, 1871.

IMPROVEMENT IN CULINARY VESSELS.

The Schedule referred to in these Letters Patent and making part of the same.

*To all whom it may concern:*

Be it known that I, WILLIAM H. MURCH, of Portland, in the county of Cumberland and State of Maine, have invented a new and useful Improved Culinary Vessel; and I do hereby declare the following to be a full, clear, and exact description thereof which will enable others to make and use my invention, reference being had to the accompanying drawing forming part of this specification, in which is shown a sectional elevation illustrating my invention.

My invention consists in the combination of a series of culinary vessels arranged together in a manner hereinafter to be described, for the purpose of cooking a variety of articles by the same fire at the same time, and in separate compartments, in order that the juices and vapor of one may not commingle with those of the others and so change the flavor thereof, as when meats and vegetables are being cooked at the same time.

I am aware that the parts $a\ b\ c\ d$, composing a single culinary vessel having a cover, are not new, and I do not claim the illustrated arrangement of the vessel $d$.

My invention consists in the combination of several compartments, the whole constructed as hereinafter described, each one containing a vessel, $d$, and so arranged that the bottoms of all but the lower compartment are removable, and form at the same time the top of the under compartment and the bottom of the compartment next above.

This is illustrated at $e$, which has two flanges, $f$ and $h$—$h$ extending down into the lower compartment, and $f$, either up within the compartment above or up on the outside of the walls thereof.

There may be two or more of these partitions, the top one having the removable cover $i$ and the flange $j$.

The outer walls $a$ are made of sheet-iron, and those like the walls of the upper compartment, for instance, may be riveted or bolted to and so as to be removable from the bottom $e$, when the flange $f$ passes up on the inside of the same.

The entire combination may be so made as to be inserted within a stove-oven, or so as to form the oven itself of a stove.

The vessels $d$ are removable, but this is not claimed.

Different articles are placed in the several vessels $d$, the vessels then placed in the several compartments, one above another, and the whole at the same time submitted to the action of the heat and cooked without the vapors from any one article affecting the articles contained in any other compartment.

I do not claim, by itself, a culinary vessel with several compartments. I desire to embrace only the combination of all of the devices claimed and described.

I do not claim such a culinary apparatus as that of T. W. Moore, January 21, 1868, No. 73,630, where the vessels have inclined bottoms to guide the liquids; where they also have a pipe to conduct the steam to the different compartments. My improvement is different from this in several particulars, among which are the flanged covers and bottoms, the movable interior vessel $d$, and the method of cooking.

Neither do I claim a device like that of I. S. Bunnell, May 10, 1870, No. 102,765, which is for vessels placed one upon the other, having false bottoms, and being connected with the steam-pipe. One of the objects of my invention is to prevent all communication between the different compartments of my apparatus, and I have no perforated false bottom or steam-pipe.

What I claim as my invention, and desire to secure by Letters Patent, is—

The combination of two or more compartments, one above another, each containing the vessel $d$, and so arranged and constructed that the top of each compartment forms the bottom of the one next above it, and has the upward and downward flanges $f\ h$ and the uppermost compartment, the cover $i$ having flanges $j$, all in the manner and for the purposes set forth.

WM. H. MURCH.

Witnesses:
WM. FRANKLIN SEAVEY,
HENRY C. HOUSTON.